United States Patent [19]

Shamah et al.

[11] Patent Number: 4,772,166

[45] Date of Patent: Sep. 20, 1988

[54] DUAL EXPANSION ANCHOR

[75] Inventors: Alfred A. Shamah; James R. Schroeder, both of York, Pa.

[73] Assignee: U.S.E. Diamond, Inc., York, Pa.

[21] Appl. No.: 147,246

[22] Filed: Jan. 22, 1988

[51] Int. Cl.⁴ .............................................. F16B 13/04
[52] U.S. Cl. ........................................ 411/32; 411/24; 411/55; 405/259
[58] Field of Search ..................................... 411/24–28, 411/32, 33, 55, 60, 57, 72, 73, 49, 50; 405/259, 260

[56] References Cited

U.S. PATENT DOCUMENTS 683,082  9/1901  Summerer ............................. 411/28
2,525,198 10/1950 Beijl ....................................... 411/26

FOREIGN PATENT DOCUMENTS 62280 10/1982 European Pat. Off. .............. 411/27

Primary Examiner—Neill R. Wilson
Attorney, Agent, or Firm—Stoll, Wilkie, Previto & Hoffman

[57] ABSTRACT

A dual expansion anchor comprising a pair of inner and outer expansion fasteners connected to each other by means of a screw-threaded connecting tie, said expansion fasteners being adjustable on the connecting tie to adjust to the spaced positions of an inner supporting structure and an outer supported wall. Insertion limiting means is provided to limit insertion of the inner expansion fastener into the inner supporting structure in order to fix the position of said expansion fastener in said supporting structure. Torque applying means applied to the connecting tie expands the inner expansion fastener. Torque applying means applied to a nut on the connecting tie expands the outer expansion fastener.

8 Claims, 2 Drawing Sheets

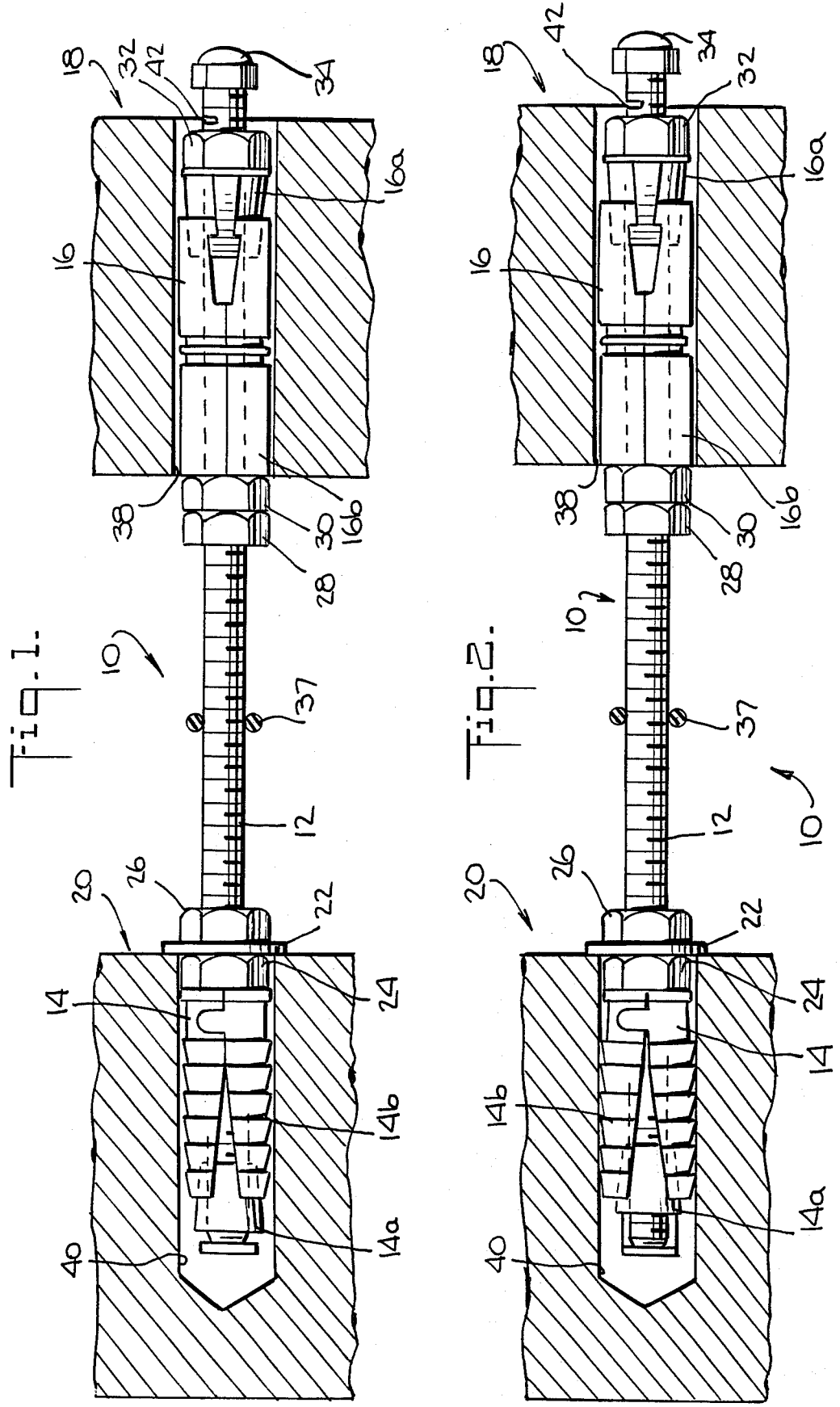

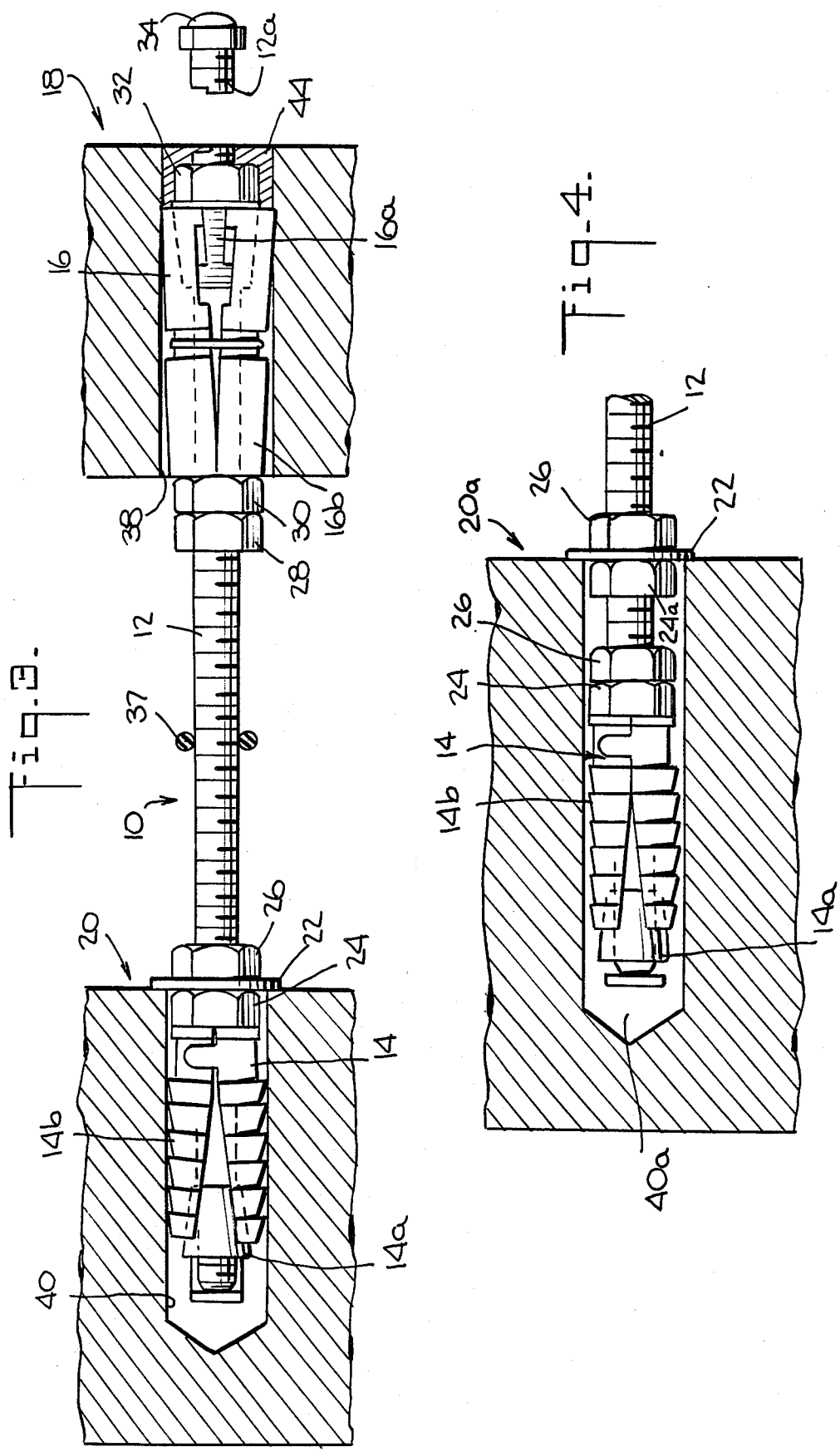

DUAL EXPANSION ANCHOR

BACKGROUND OF THE INVENTION

1. Field of Invention:

This invention relates to the use of expansion anchors in the placement, replacement or repair of nonloadbearing facades on buildings and other structures.

2. Prior Art:

Dual expansion anchors having individually operable expansion fasteners are known to the prior art for the stated purpose.

The closest patents known to applicants are the following:

| | |
|---|---|
| 2,892,226 | Bradney |
| 3,296,919 | Williams |
| 3,922,831 | Fischer |
| 3,937,121 | Schubert |
| 4,050,346 | Fischer |
| 4,053,982 | Weissman |
| 4,094,223 | Fischer |
| 4,366,651 | Thomas et al |
| 4,631,889 | Adam et al |

The closest prior publications and competitive products on the market known to applicants are the following:

a. The Construction Specifier, June, 1984 "Solving Problems Through Reanchoring", S. H. Getz, pp. 72–4;

b. Dur-O-Wal, Inc., Northbrook, Ill. 60062, Dur-O-Wal Repair Anchor, Technical Bulletin 85–14; and c. Hilti (Canada) Limited, Bramalea, Ontario, Canada, Hilti Wall-Tie, the Remedial Anchor for Cavity Walls.

But applicants have no knowledge of any prior art having the following features:

a. A single axis dual expansion anchor having standard expansion fasteners mounted on a standard threaded rod functioning as a connecting tie;

b. A dual expansion anchor wherein the expansion fasteners are adjustable on the connecting tie to adjust the spacing between them; and c. A dual expansion anchor capable of being set and tested in tension and shear as to each expansion fastener separately with no cross wall or lateral stress during or after set in either wall.

SUMMARY OF THE INVENTION

The present invention comprises a single axis dual expansion anchor which is adapted for use in installing, replacing or repairing facades on buildings or for other uses adapted to single axis dual expansion anchors. For purposes of illustration and economy of space, the invention will be discussed in connection with building facade work.

Building wall and facade materials may differ from building to building. Different expansion fasteners may be suited to the different materials. The use of standard expansion fasteners makes it possible to adapt the type of fastener to the type of material. Illustrative of the standard expansion fasteners that are suited for this invention are the expansion fasteners that are made and sold under the registered trademarks Forway and Keystone by U.S.E. Diamond, Inc., 500 State Street, York, Pa. 17405.

Building wall and facade thicknesses and other specifications may also differ from building to building. The use of standard expansion fasteners makes it possible to adapt the dimensions of the fasteners to the requirements of the installation. The use of a standard threaded rod as the connecting tie, and a breakaway cut at a selected location on said tie, makes it possible to terminate the tie at or within the outer face of facades of different thickness.

The spacing between building wall and facade may differ from building to building. The use of a standard threaded rod as the connecting tie for standard expansion fasteners makes it possible to adjust the relative positions of the fasteners on the connecting tie to adjust to the spacing of the building wall and facade. It is thereby possible to tie the building wall and facade together without creating a stress between them.

DESCRIPTION OF THE DRAWING

FIG. 1 is a sectional view through a building wall and a facade, showing a dual expansion anchor, made in accordance with the present invention, in place in registering holes in said wall and facade.

FIG. 2 is a view similar to that of FIG. 1, but showing the inner expansion fastener in expanded condition in the building wall.

FIG. 3 is a view similar to that of FIG. 2, showing the outer expansion fastener in expanded condition in the facade and the connecting tie broken away at the face of the facade.

FIG. 4 is a fragmentary view of the dual expansion anchor as shown in FIG. 1, but showing adjustable insertion limitation means for controlling the depth of insertion into the building wall.

DESCRIPTION OF PREFERRED EMBODIMENT OF THE INVENTION

The dual expansion anchor 10 shown in the drawing comprises a connecting tie 12 in the form of a threaded rod, an inner expansion fastener 14 and an outer expansion fastener 16. What this dual expansion anchor does is to tie facade (outer wall) 18 to building wall (inner wall) 20.

For illustration purposes, inner expansion fastener 14 will be deemed to be a standard ½"D expansion fastener, outer expansion fastener 16 will be deemed to be a standard ⅝"D expansion fastener, and connecting tie 12 will be deemed to be a ¼"D threaded rod. The wedge nut 14a of the inner expansion fastener has a ¼"D threaded hole for screw-threaded engagement with connecting tie 12. The wedge nut 16a of the outer expansion fastener 16 has a 5/16"D threaded hole, too large for screw-threaded engagement with the ¼"D connecting tie 12.

It will be noted that behind inner expansion fastener 14, on connecting tie 12, are a washer 22 and nuts 24 and 26. These nuts lock themselves and the washer in place on the connecting tie and they serve as a backstop for the expansion sleeve 14b. Washer 22 has a diameter between ½" and ⅝", for example, 9/16". The reason for this dimension will shortly be explained.

It will also be noted that behind outer expansion fastener 16, on connecting tie 12, is a pair of nuts 28 and 30 that lock themselves to connecting tie 14. These nuts (and particularly nut 30) serve as a backstop for the expansion sleeve 16b. Another nut 32 on the connecting tie abuts wedge nut 16a of the outer expansion fastener.

The dual expansion anchor has one more element, an acorn nut 34, at the outer end of the connecting tie. The dual expansion anchor may also have an "O" ring 37 on its connecting tie to serve as a moisture barrier between the building wall and the facade.

In the use of the present invention, registering holes 38 and 40 are drilled into facade 18 and building wall 20 respectively. Hole 38 has a ⅜" diameter with sufficient clearance to accommodate the ⅜"D expansion fastener 16. Hole 40 has a ¼" diameter with sufficient clearance to accommodate the ¼"D expansion fastener 14. The two expansion fasteners are spaced on the connecting tie to correspond to the desired spacing of the building wall and facade. Should the spacing of the expansion fasteners require adjustment this may be done by adjusting the positions of nuts 28, 30 and 32. Expansion fastener 16 is longitudinally slidable on the connecting tie by reason of the 5/16"D hole in the fastener and the ¼"D of the connecting tie.

Inner expansion fastener 14 is properly positioned in hole 40 by reason of the presence of washer 22 that serves as a stop against building wall 20. See FIG. 1. And inner expansion fastener 14 is the first to be set. This operation is performed by applying a torque tool, e.g., a torque wrench, to acorn nut 34. The result is shown in FIG. 2 wherein expansion fastener 14 is shown expanded in hole 40. Shear and tension can now be tested independently of outer expansion fastener 16.

Outer expansion fastener 16 is properly positioned in hole 38 by reason of the above described adjustment of the position of said expansion fastener on connecting tie 12 relative to the inner expansion fastener 14. To expand outer expansion fastener 16 in hole 38, the outer end 12a of the connecting tie 12 is broken away at break-off cut 42. This exposes nut 32 for engagement with a torque tool such as a torque wrench. See FIG. 3. By tightening nut 32 against wedge nut 16a sleeve 16b is caused to expand against the wall of hole 38. Shear and tension can now be tested independently of the inner expansion fastener 14. The installation of the dual expansion anchor comprising the present invention is now complete, but for appearance purposes, a filler 44 may be inserted into the outer end of hole 38 to conceal nut 32 and connecting tie 12. See FIG. 3.

Referring to FIG. 4, it will be seen that washer 22 has been removed from between nuts 24 and 26. These two nuts are now locked directly to each other and to connecting tie 12. Washer 22 is now placed between two additional nuts 24a and 26a which lock to the connecting tie.

It will be understood that nuts 24a and 26a are adjustably positionable on the connecting tie and, consequently, washer 22 will now function as an adjustable insertion limitation means for expansion fastener 14. As shown in FIG. 4, building wall 20a is thicker than building wall 20 of FIGS. 1-3 and expansion fastener 14 is inserted more deeply into hole 40a in wall 20a than into hole 40 in wall 20. This requires moving washer 22 and locking nuts 24a and 26a away from nut 26 a distance corresponding to the added depth of insertion desired.

The foregoing is illustrative of a preferred form of the invention and it will be understood that modifications of this form as well as other forms are contemplated within the scope of the appended claims. For example, the particular types of expansion fasteners shown in the drawing illustrate the many kinds of standard expansion fasteners that may be used in the invention.

We claim:

1. A dual expansion anchor comprising:
   a. a screw-threaded connecting tie,
   b. a first expansion fastener on said connecting tie at one end thereof,
   c. a second expansion fastener on said connecting tie at the opposite end thereof,
   d. each of said expansion fasteners comprising an expansion sleeve and a wedge nut in engagement therewith,
   e. the wedge nut of the first expansion fastener being threaded to the connecting tie,
   f. the wedge nut of the second expansion fastener being mounted on, but free from threaded engagement with, the connecting tie,
   g. first stop means on said connecting tie engaging the expansion sleeve of the first expansion fastener,
   h. said expansion sleeve of the first expansion fastener being expandable when the connecting tie is rotated relative to the wedge nut of said first expansion fastener to draw it against said expansion sleeve,
   i. second stop means on said connecting tie engaging the expansion sleeve of the second expansion fastener,
   j. an additional nut threaded to said connecting tie,
   k. said additional nut abutting the wedge nut of the second expansion fastener, and
   l. the expansion sleeve of the second expansion fastener being expandable when the additional nut is rotated relative to the connecting tie to drive said wedge nut of the second expansion fastener against said expansion sleeve.

2. A dual expansion anchor in accordance with claim 1, wherein:
   a. each stop means comprises a pair of nuts threaded to the connecting tie, and
   b. the individual nuts of each pair of nuts being tightened against each other to lock them to the connecting tie.

3. A dual expansion anchor in accordance with claim 1, wherein:
   a. one end of the connecting tie extends beyond the additional nut, and
   b. torque tool engaging means is provided on said end of the connecting tie,
   c. whereby applying a torque force to said torque tool engaging means causes rotation of the connecting tie to expand the expansion sleeve of the first expansion fastener.

4. A dual expansion anchor in accordance with claim 3, wherein the torque tool engaging means is an acorn nut threaded to said end of the connecting tie.

5. A dual expansion anchor in accordance with claim 3, wherein:
   a. a break-off cut is formed in the end of the connecting tie that extends beyond the additional nut, and
   b. whereby said end of the connecting tie can be broken away at the break-off cut to expose the additional nut for engagement with a torque force applying tool.

6. A dual expansion anchor in accordance with claim 1, wherein:
   a. the second stop means is threaded for engagement with the connecting tie, and
   b. the second expansion fastener is longitudinally adjustable on the connecting tie by longitudinally adjusting said second stop means and said additional nut.

7. A dual expansion anchor in accordance with claim 1, wherein:

a. insertion limiting means is provided on the connecting tie adjacent the first expansion fastener,
b. whereby insertion of said first expansion fastener into a hole in a supporting structure is limited by said insertion limiting means.

8. A dual expansion anchor in accordance with claim 1, wherein:
a. longitudinally adjustable insertion limiting means is provided on the connecting tie between the first and second expansion fasteners,
b. whereby longitudinal adjustment of said insertion limiting means relative to said connecting tie adjusts the depth of insertion of the first expansion fastener into a hole in a supporting structure.

* * * * *